(12) United States Patent
Kotteri et al.

(10) Patent No.: US 11,625,048 B2
(45) Date of Patent: Apr. 11, 2023

(54) APPARATUS AND METHOD FOR DETERMINING TOW HITCH LOCATION

(71) Applicant: JAGUAR LAND ROVER LIMITED, Coventry (GB)

(72) Inventors: Jithesh Kotteri, Warwickshire (GB); Nigel Clarke, Warwickshire (GB); Martin Edney, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 437 days.

(21) Appl. No.: 16/332,516

(22) PCT Filed: Aug. 23, 2017

(86) PCT No.: PCT/EP2017/071247
§ 371 (c)(1),
(2) Date: Mar. 12, 2019

(87) PCT Pub. No.: WO2018/050417
PCT Pub. Date: Mar. 22, 2018

(65) Prior Publication Data
US 2019/0265723 A1    Aug. 29, 2019

(30) Foreign Application Priority Data
Sep. 15, 2016 (GB) ..................... 1615689

(51) Int. Cl.
*G05D 1/02* (2020.01)
*B60R 1/00* (2022.01)
*G06T 7/73* (2017.01)

(52) U.S. Cl.
CPC ........... *G05D 1/0251* (2013.01); *B60R 1/003* (2013.01); *B60R 2300/303* (2013.01);
(Continued)

(58) Field of Classification Search
CPC .............. G05D 1/0251; B60R 1/003; B60R 2300/303; B60R 2300/808; G06T 7/74; G06T 2207/20061
See application file for complete search history.

(56) References Cited

U.S. PATENT DOCUMENTS

2014/0125795 A1    5/2014 Yerke
2015/0217693 A1 *  8/2015 Pliefke ................... H04N 7/183
                                                        348/118
(Continued)

FOREIGN PATENT DOCUMENTS

CN       105705349 A        6/2016
DE   102010006521 A1 *      9/2010 ............. B60D 1/245
EP       3081405 A2         10/2016

OTHER PUBLICATIONS

International Search Report and Written Opinion, PCT/EP2017/071247, dated Oct. 10, 2017, 14 pp.
(Continued)

*Primary Examiner* — Maceeh Anwari
*Assistant Examiner* — Charles Pall
(74) *Attorney, Agent, or Firm* — McCoy Russell LLP (57) ABSTRACT

Embodiments of the present invention provide a system for determining a location of a tow hitch (280) mounted to a vehicle (250), comprising imaging means (260) disposed in relation to the vehicle to output image data corresponding to an image (105), and processing means (200, 210) arranged to receive the image data (270), wherein the processing means is arranged to select image data corresponding to a region (310) of the image and to search within the selected data for image data corresponding to the tow hitch (280) to determine the location of the tow hitch within the image.

20 Claims, 3 Drawing Sheets (52) U.S. Cl.
CPC ........... *B60R 2300/808* (2013.01); *G06T 7/74* (2017.01); *G06T 2207/20061* (2013.01)

(56) References Cited

U.S. PATENT DOCUMENTS

| | | | |
|---|---|---|---|
| 2015/0321666 A1* | 11/2015 | Talty | G05D 1/0259 |
| | | | 701/41 |
| 2016/0075281 A1 | 3/2016 | Singh et al. | |
| 2016/0245659 A1* | 8/2016 | Ohba | B62D 13/06 |
| 2016/0272024 A1 | 9/2016 | Bochenek et al. | |
| 2016/0378118 A1* | 12/2016 | Zeng | B60D 1/62 |
| | | | 701/28 |
| 2017/0151846 A1* | 6/2017 | Wuergler | B62D 15/029 |
| 2017/0270378 A1* | 9/2017 | Guan | G06V 10/44 |

OTHER PUBLICATIONS

Bileschi et al., "Image Representations Beyond Histograms of Gradients: The Role of Gestalt Descriptors," Computer Vision and Pattern Recognition, Jun. 1, 2007.

Search and Examination Report, GB1615689.5, dated Mar. 8, 2017, 5 pp.

* cited by examiner

APPARATUS AND METHOD FOR DETERMINING TOW HITCH LOCATION

CROSS-REFERENCE TO RELATED APPLICATIONS

This application is a 371 of International Application No. PCT/EP2017/071247, filed Aug. 23, 2017, which claims priority to GB Patent Application 1615689.5, filed Sep. 15, 2016, the contents of both of which are incorporated by reference herein in their entirety.

TECHNICAL FIELD

The present disclosure relates to a controller and method and particularly, but not exclusively, to a controller and method for determining a location of a tow hitch. Aspects of the invention relate to a system, to a controller, a vehicle, to a method and to computer software.

BACKGROUND

It is often desired to tow a trailer with a vehicle. In order to do this a releasable coupling is provided between the vehicle and the trailer. The coupling is formed by a tow hitch mounted upon the vehicle and a corresponding trailer coupling mounted upon the trailer, usually extending forward of the trailer on an A-frame. The tow hitch may be a tow ball, although other tow hitches are known such as those having a vertical pin. Usually the tow hitch is mounted at a rear of the vehicle, although forward facing tow hitches are also used, particularly for slow-speed maneuvering of trailers.

It is known to provide an image containing the tow hitch to assist a driver the vehicle maneuvering the vehicle into alignment with the trailer coupling for hitching the trailer to the vehicle. The image may be displayed on a visual display in the vehicle. A location of the tow hitch may also be indicated in the image in order to assist the driver locating the tow hitch. The location of the tow hitch within the image is generally pre-set according to a location of one or more cameras providing the image and a location at which the tow hitch is designed to be mounted about the vehicle. However, manufacturing tolerances associated with one or both of the camera mounting and/or the tow hitch may cause misalignment of the expected relative location of the camera and tow hitch. Furthermore, if the mounting of the camera(s) and/or tow hitch is moved, for example accidentally during a lifetime of the vehicle, then the pre-set relative position of the indication of the tow hitch location is also moved.

It is an object of embodiments of the invention to at least mitigate one or more of the problems of the prior art.

SUMMARY OF THE INVENTION

Aspects and embodiments of the invention provide a system for determining a location of a tow hitch, a tow assist controller, a method of determining a location of a tow hitch, a vehicle and computer software as claimed in the appended claims.

According to an aspect of the invention, there is provided a system for determining a location of a tow hitch mounted to a vehicle, comprising imaging means for outputting image data and processing means arranged to search the image data for image data corresponding to a tow hitch to determine the location of the tow hitch within the image. Advantageously, even if the location of the tow hitch moves relative to the imaging means, the location of the tow hitch can be accurately determined.

According to an aspect of the invention, there is provided a system for determining a location of a tow hitch mounted to a vehicle, the system comprising imaging means disposed in relation to the vehicle to output image data corresponding to an image, processing means arranged to receive the image data, wherein the processing means is arranged to select image data corresponding to a region of the image and to search within the selected data for image data corresponding to the tow hitch to determine the location of the tow hitch within the image. Advantageously, even if the location of the tow hitch moves relative to the imaging means, or is initially disposed in an unexpected location, the location of the tow hitch can be accurately determined.

The system as described above, wherein
the imaging means comprises one or more imaging devices; and
the processing means comprises one or more processing devices.

The region of the image may be a predetermined region within the image. Advantageously the region may be identified a priori to reduce computation.

The processing means is optionally arranged to determine one or more potential locations of the tow hitch within the image by determining a location of a predetermined shape within the image corresponding to at least a portion of the tow hitch. Advantageously the one or more potential locations may be easily identified. Advantageously the one or more locations may be identified in variable lighting conditions, or upon different backgrounds. Optionally the predetermined shape is a circle. Advantageously a circular portion of the tow hitch may be prominently visible.

The processing means may be arranged to determine a distribution of gradients associated with each potential location of the tow hitch within the image. Advantageously the distribution of gradients allows determination of a correct location of the tow hitch, even in a presence of a background.

The processing means may be arranged to apply a Hough transform to the selected region of the image to identify one or more locations of the predetermined shape, each location corresponding to a respective potential location of the tow hitch. The Hough transform advantageously determines the location of the shape in a reliable manner.

The processing means may be arranged to output a Histogram of Gradients, HOG, associated with each potential location of the tow hitch within the image. The HOG advantageously allows the potential locations to be reliably determined even in the presence of variable illumination or shadow and on various backgrounds.

Optionally the processing means is arranged to identify the location of the tow hitch in the image from each potential location of the tow hitch within the image using a classifier. The classifier may be a Support Vector Machine, SVM, classifier. The classifier allows reliable determination of the location.

The processing means may be arranged to search within the selected image data for an image template corresponding to at least a part of the tow hitch to determine a tow hitch region of the image data. Advantageously the image template allows various shaped tow hitches to be identified.

Optionally the processing means is arranged to search within the selected image data using a SURF feature detector. Advantageously the SURF detector may eliminate the need for prior shape detection.

The processing means is, optionally, arranged to fit a shape corresponding to the tow hitch to the tow hitch region of the image data to determine the location of the tow hitch within the image. Advantageously the image template allows various shaped tow hitches to be identified.

The system may comprise output means arranged to provide an indication to an occupant of the vehicle indicative of the location of the tow hitch. Advantageously the indication may be used to direct the occupant to the tow hitch.

The output means may comprises a visual display means. The indication indicative of the location of the tow hitch optionally comprises a representation of at least a portion of the image and a visual indicator indicative of the location of the tow hitch. Advantageously the visual representation may be easily appreciated.

The processing means may be arranged to output an indication indicative of the location of the tow hitch to an autonomous driving module.

According to an aspect of the invention, there is provided a controller for a vehicle tow assist system, the controller comprising input means for receiving image data corresponding to an image of a region proximal to a vehicle, processing means for selecting image data corresponding to a region of the image, and searching within the selected image data for image data corresponding to a tow hitch mounted to the vehicle to determine the location of the tow hitch within the image.

The controller described above, wherein:
the input means comprises one or more electrical inputs for receiving the image data; and
the processing means comprises one or more processing devices.

The controller may comprise output means for outputting an indication indicative of the location of the tow hitch. The output means may comprises one or more electrical outputs for outputting the indication.

Optionally the processing means is arranged to determine one or more potential locations of the tow hitch within the image by determining a location of a predetermined shape within the image data corresponding to at least a portion of the tow hitch. The predetermined shape may be a circle.

According to an aspect of the invention, there is provided a method of determining a location of a tow hitch mounted to a vehicle, the method comprising receiving image data corresponding to an image of a region proximal to a vehicle, selecting a region within the image, and searching within the selected region for image data corresponding to the tow hitch to determine the location of the tow hitch within the image.

The searching within the selected region may comprise determining a location of a predetermined shape within the image data corresponding to the tow hitch. Optionally the predetermined shape is a circle.

The determining the location of the predetermined shape may comprise searching the selected region of the image using a Hough transform to the selected region of the image to identify one or more locations of the predetermined shape, each location corresponding to a respective potential location of the tow hitch.

The method may comprise outputting a Histogram of Oriented Gradients (HOG) for each of one or more potential locations for the tow hitch in the selected region.

The method may comprising identifying the location of the tow hitch in the image data from each of the potential locations using a classifier. Optionally the classifier is a Support Vector Machine, SVM, classifier.

The searching within the selected region may comprise searching the selected region for a template corresponding to at least a part of the tow hitch to identify a tow hitch region of the image data.

Searching the selected region for the image template optionally comprises applying a SURF feature detector to the selected region.

The method may comprise fitting a shape corresponding to the tow hitch to the tow hitch region of the image data to determine the location of the tow hitch within the image.

The method may comprise outputting an indication to an occupant of the vehicle indicative of the location of the tow hitch.

The indication may be output by a visual display means. The indication indicative of the location of the tow hitch optionally comprises a representation of at least a portion of the image data and a visual indicator indicative of the location of the tow hitch within the image.

According to an aspect of the invention, there is provided a vehicle comprising a system as described above, a controller as described above or arranged to perform a method as described above.

According to an aspect of the invention, there is provided computer software which, when executed, is arranged to perform a method as described above. The computer software may be stored on a computer readable medium. The computer software may be tangibly stored on a computer readable medium. The computer readable medium may be non-transitory.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
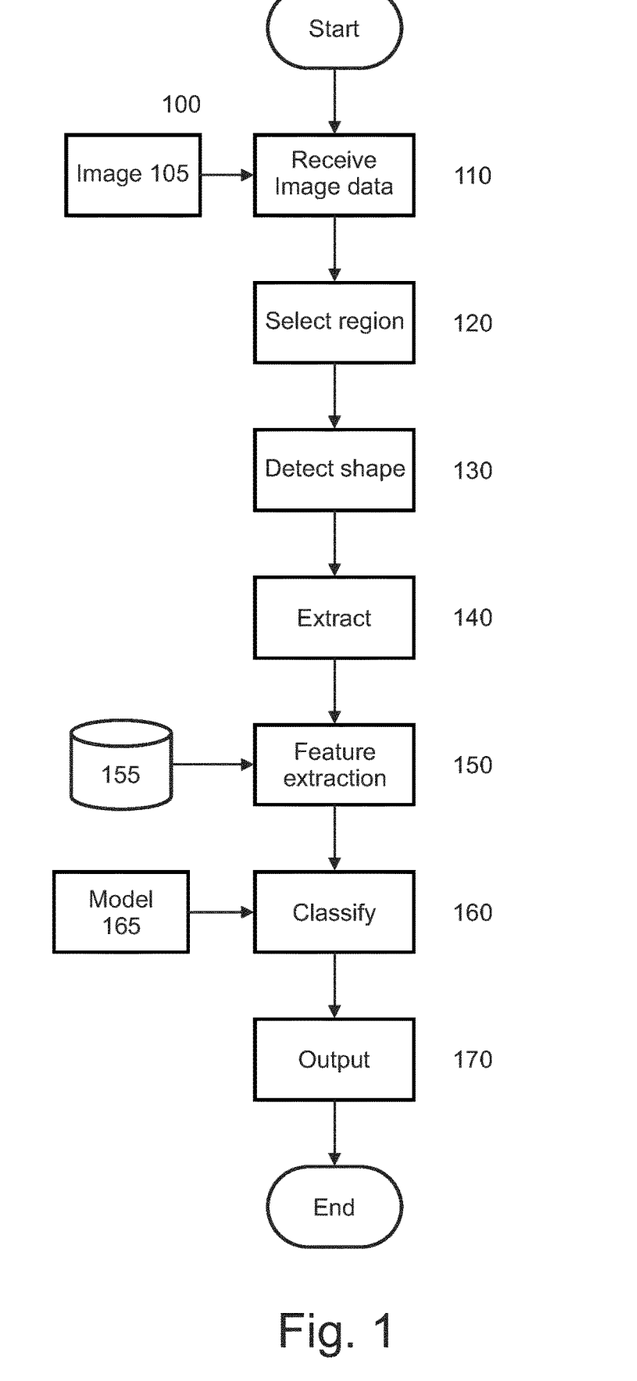
FIG. 1 shows a method according to an embodiment of the invention.

FIG. 1 illustrates a method 100 according to an embodiment of the invention. The method is a method 100 of determining a location of a tow hitch mounted to a vehicle. The method 100 will be described with reference to FIG. 2 which illustrates a portion of a vehicle 250 having a tow hitch 280 mounted thereto and a system according to an embodiment of the invention.

Figure 2:
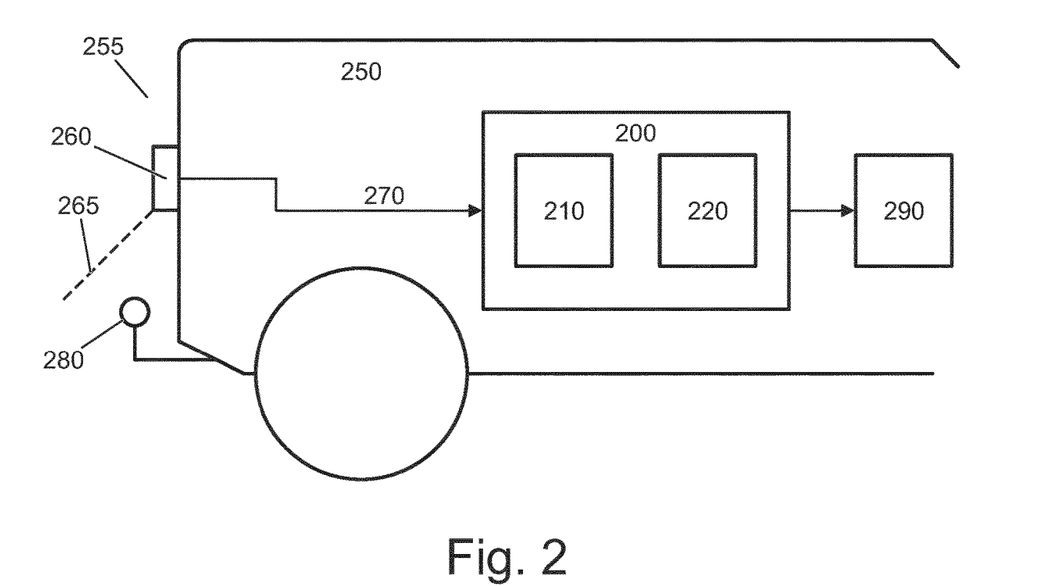
FIG. 2 shows a vehicle comprising a tow assist controller according to an embodiment of the invention.

The vehicle 250 illustrated in FIG. 2 comprises a tow assist means 200 which, in an embodiment of the invention, is a tow assist controller 200. The tow assist controller 200 comprises an input for receiving image data 270 from an imaging means 260.

The imaging means 260 may comprise one or more imaging devices 260 in some embodiments of the invention. The embodiment illustrated in FIG. 2 comprises a camera 260 although further cameras may be provided. The imaging means 260 may, in some embodiments, comprise a first camera 260 disposed at the rear of the vehicle 250. Second and third cameras may, in some embodiments, be arranged on respective left and right sides of the vehicle 250. The second and third cameras can, for example, be mounted in respective left and right wing mirror housings, although other mounting locations may be envisaged. The first camera 260 is arranged to provide the image data 270 corresponding to an area of the vehicle 250 where the tow hitch 280 is located, as indicated by line 265 indicating an example field-of-view of the camera 260. The first camera 260 is, in some embodiments, arranged to image a rear 255 of the vehicle 250 where the field of view 265 of the camera 260 encompasses the location of the tow hitch 280. In some embodiments the camera is provided with illumination means (not shown) for illuminating the rear 255 of the vehicle 250 to aid operation in low light levels or darkness. The illumination means may operable provide non-visible illumination such as infra-red (IR) which may be received by the camera 260 but not noticeable to humans. The illumination means may be, for example, one or more light emitting devices such as LEDs. The image data 270 may be provided to the tow assist controller 200 via a communication bus of the vehicle 250, which may be a CAN bus or an IP-based communication bus, such as Ethernet, although other protocols may be envisaged. Furthermore, the image data 270 may be provided in some embodiments over a dedicated connection between the camera 260 and the tow assist controller 200. The image data 270 corresponds to an image of a region proximal to the vehicle 250 where the tow hitch 280 is located.

The tow assist controller 200 comprises a processing means 210 and a memory means 220. The processing means 210 may comprise one or more processing devices, such as electronic computer processors. The one or more processing devices may, in use, execute computer instructions in the form of computer software. The memory means 220 may comprise one or more electronic memory devices communicably coupled to the one or more processing devices 210. The memory device(s) 220 may store the computer software operably executed by the processing device(s) 210 and may store data temporarily during execution of the computer software, such as the image data 270 received by the controller 200. It will be appreciated that the controller 200 may comprise other elements not specifically illustrated in FIG. 2, such as one or more buffers for storing the image data 270 and one or more image processing means for processing the image data 270 in the one or more buffers. The processing means 210 may operatively implement an embodiment of the method 100 illustrated in FIG. 1. In some embodiments, the tow assist controller 200 is communicatively coupled to a display means 290. The tow assist controller 200 is arranged to, in use, provide an indication of the location of the tow hitch via the display means 290, as will be explained. The software executed by the processing means 210 may comprise a module for implementing each respective step of the method 100 illustrated in FIG. 1.

Referring to FIG. 1, the method comprises a step 110 of receiving image data. The image data corresponds to an image 105, as shown in FIG. 1. The image is of a region proximal to the vehicle 250 where the tow hitch 280 is located.

The 110 image data 270 is output by the camera 260 where a portion of the image data 270 corresponds to a location of the tow hitch 280. That is, at least some of the one or more imaging devices 260 providing the image data 270 have a field of view which includes the location of the tow hitch 280, such that the at least a portion of the tow hitch is visible within the image data 270 when output on a display means 290. The image data 270 is received by the tow assist controller 200 in step 110. The image data 270 may be received by the tow assist controller 200 by receiving one or more packets of data comprising portion of the image data 270. The image data 270 may be in the form of a video stream which may be encoded according to a predetermined format. The image data may comprise a stream of frames of data each providing a still image at a respective point in time, as will be appreciated. The predetermined format may be according to a Motion Picture Experts Group (MPEG) format, although other formats may be used. The image data may be stored at the tow assist controller 200, such as in the memory means 220. It will be understood, therefore, that the image may be a frame of the video stream.

Step 110 may comprise one or more pre-processing steps. The pre-processing may be performed for one or more of removing noise present in the image data 270, for altering one or more characteristics of the image data 270, such as reducing contrast or brightness of the image data, or to provide image enhancement.

Figure 3:
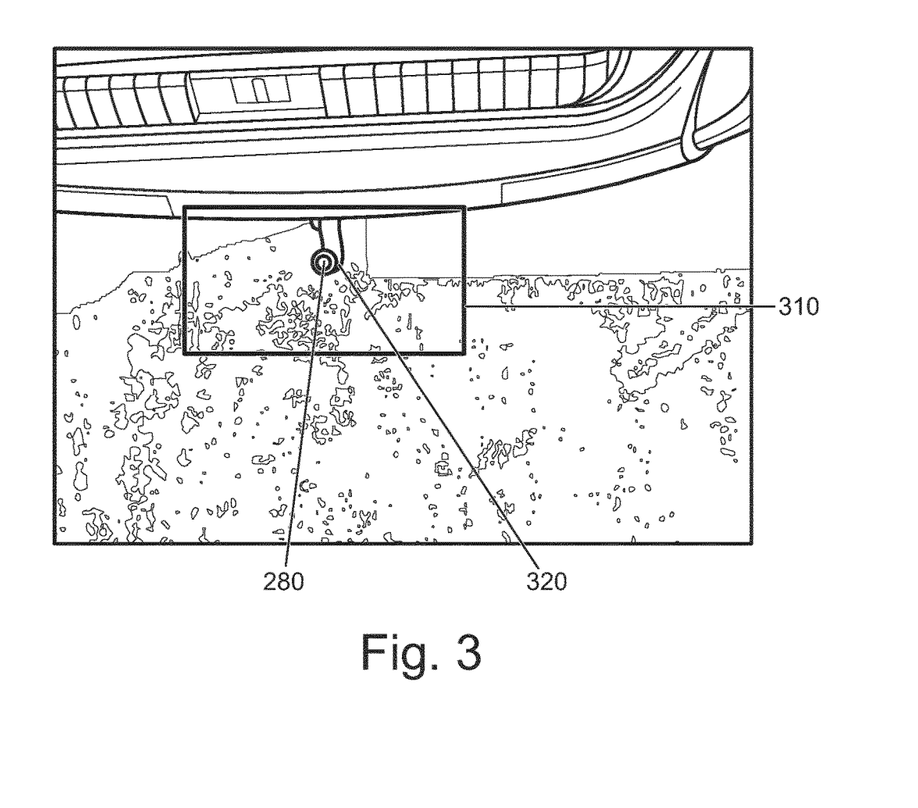
FIG. 3 shows a representation of image data corresponding to an embodiment of the invention.

In step 120 a region of the image 105 is selected. The region may be a predetermined region of the image 105. The region may be selected based upon an expected, approximate, location of the tow hitch 280 and a resolution of the camera 260. The region may be a rectangular region between first and second opposite corner locations in the image 105, the location of each corner location may be determined as a coordinate (x, y) with respect to a datum such as a corner of the image 105. In some embodiments the image may be cropped to the selected region, such that a size of the image 105 is reduced. However in other embodiments an outer portion of the image 105 remains but is eliminated from further processing since the tow hitch 280 is not expected to reside in this outer region. The region may be a region of a frame of the video data. A location of the region is determined in order to encompass the location of the tow hitch 280. That is, the region is positioned within the frame such that the tow hitch 280 is visible within the region. FIG. 3 is an example image from the image data 270 in which the tow hitch 280 is visible. The region is indicated in FIG. 3 as reference 310. As can be appreciated, the region 310 is a portion of a frame of the image data 270 selected to include the tow hitch. The region 310 may be selected to be large enough to allow movement of the imaging device or camera 260 either during manufacture or use of the vehicle 250. In other words, relative movement of the tow hitch 280 (which may be moveably mounted, such as retractable under the vehicle 250) and camera 260 is accommodated such that the tow hitch 280 continues to remain with the region 310. The region 310 may be rectangular, although other shaped regions may be envisaged. Step 120 may be performed by a region selection module operatively executing to select the region 310 of the image 105 on the processing means 210 of the tow assist controller 200.

In steps 130 to 160 of the method 100 illustrated in FIG. 1 the region 310 is searched for image data corresponding to the tow hitch 280. It will be appreciated that selecting a region of the image, in step 120, in which to search, may advantageously reduce the time taken to process the image in steps 130 to 160 when compared to searching within the whole image 105 or corresponding image data 110. The search is performed to determine the location of the tow hitch 280 within the region 310 of image data. The steps illustrated in FIG. 1 provide a method of searching according to an embodiment of the invention. Another method of searching the image data according to an embodiment of the invention will be described with reference to FIG. 5.

In step 130 a predetermined shape is detected in the region 310 of image data 270. Step 130 may be performed by a shape detection module operatively executing on the processing means 210 of the tow assist controller 200. In step 130 in some embodiments the predetermined shape is a circle. The use of a circle is selected for embodiments where the tow hitch is a tow ball i.e. having a generally spherical ball which appears circular from a viewing position above the tow hitch 280. Thus in some embodiments of step 130 the circle is detected in the region 310. In some embodiments a predetermined transform is used. In one embodiment the transform is a Hough transform. The transform is applied to the region 310 of image data 270. As a result of the application of the transform, one or more circular shapes are identified in the region 310 of the image data. A circular shape 320 is indicated in FIG. 3 which corresponds to the tow ball of the tow hitch 280. However it is possible that other circular features within the region 310 may be identified in step 130, such as corresponding to surface features of ground beneath the vehicle or shadows. A centre location of the shape, such as the circle may be determined in step 130. Since the tow ball will have a predictable size in the image, based upon the predetermined size of the tow ball, a resolution of the camera 260 and distance of the camera 260 from the tow ball 280, a size of the circle for which detection is performed may be constrained in step 130, thereby only identifying circular features of approximately the expected size. Thus step 130 may comprise using Hough circle detection, although in other embodiments other shapes may be detected appropriate for the tow hitch. It will be appreciated that step 130 may provide an indication of one or a plurality shapes in the region 310 which have similarity to the predetermined shape. Each shape represents a potential location for the tow hitch 280.

Figure 4:
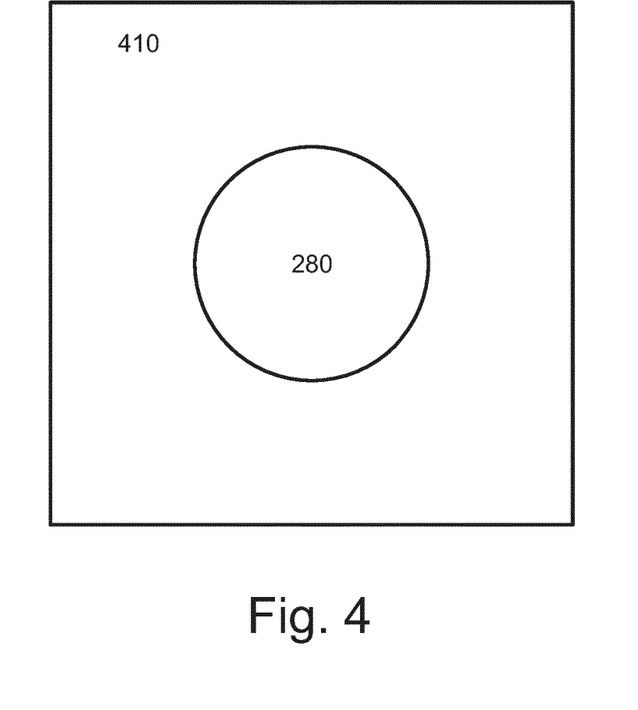
FIG. 4 shows an illustration of a template according to an embodiment of the invention.

In step 140 a template area of image data is extracted based upon the detection performed in step 130. In this embodiment, the template area is an area around each shape as identified in step 130. The template area is determined to include the one or more shapes detected in step 130. FIG. 4 illustrates an example template area 410 in relation to the determined shape 280, which in one embodiment is the circular region described above. In one embodiment the template area 410 is square, although other shaped areas may be envisaged such as rectangular. The template area 410 may be located to include the shape 280 centrally i.e. at a centre thereof, as illustrated in FIG. 4. Thus in one embodiment of step 140 a square template area 410 is extracted corresponding to each shape identified in step 130 representing a potential location for the tow hitch 280. Step 140 may be performed by a template extractor module operatively executing on the processing means 210 of the tow assist controller 200.

In step 150 one or more features of each template area 410 are extracted. Step 150 may be performed by a feature extractor module operatively executing on the processing means 210 of the tow assist controller 200. The one or more features are indicative of respective characteristics of the template area 410, thereby allowing the template area containing the tow hitch 280 to be discriminated. For example, where step 130 has identified several candidate shapes in the region 310, the one or more features allow the shape correctly corresponding to the tow hitch 280 to be identified. In one embodiment, step 150 comprises determining a distribution of gradients for each template area 410. The distribution may be a Histogram of Oriented Gradients (HOG) determined for each template area 410. The distribution of gradients or, in some embodiments the HOG, avoids a dependency on background information by capturing aspects of the shape of the tow hitch 280.

In some embodiments of step 150, information is provided from a training database 155. The training database 155 comprises distributions of gradients or, in some embodiments, HOGs corresponding to one or more training samples. Each training sample may be a reference template area, as in FIG. 4 wherein at least some of the template areas comprise a tow hitch 280. This allows a subsequent step 160 of the method to compare HOGs from the training database 155 with the HOG for each template area 410 determined in step 150 in some embodiments.

In step 160 classification is performed. Step 160 may be performed by a classification module. The classification 160 is performed to identify which of a plurality of template areas 410 determined in step 140 contains the tow hitch 280. That is, when in step 140 has identified a number of potential locations for the tow hitch 280 in the image 105, step 160 aims to positively determine which of the potential locations corresponds to the actual location of the tow hitch 280. Thus the classification step 160 is arranged to determine one of the template areas 410 positively containing the tow hitch 280.

Step 160 may be performed by a classification module operatively executing on the processing means 210. The classification module may comprise a trained model 165. The training of the model 165 may have been performed using the HOGs of the training database 155 which, as described above, in some embodiments comprises HOGs for templates areas comprising and not comprising tow hitches, thereby enabling training to be performed. It will be appreciated that training is performed before executing the method 100 to determine the location of the tow hitch 280. In some embodiments the classification module is a Support Vector Machine (SVM) classifier. The SVM classifier may be trained using the training database 155, as described, to classifier input HOGs for each potential location of the tow hitch 280 to classifier each HOG as either corresponding to, or not corresponding to, a HOG of the tow hitch 280. In this way, only some of the templates areas believed to contain the tow hitch 280 are classified as being positive i.e. corresponding to the location of the tow hitch 280 in the image 105. Thus as a result of step 160 ideally one template area 410 is determined to contain the tow hitch and therefore the location of the tow hitch 280 in the image is output from step 160.

It is possible, in step 160, that a false-positive is determined. Therefore, in some embodiments, an output of the classifier is subjected to one or more consistency checks. The one or more consistency checks may comprise validating a size of the tow hitch in the image data i.e. checking that the image data corresponding to the tow hitch is of an expected size, wherein if the image data of the tow hitch is outside of one or more predetermined size limits, such as being too large or too small, then the template area 410 may be identified as a false-positive. In some embodiments, the consistency checks may comprise checking the identified location of the tow hitch in the image 105 against an expected range of locations wherein if the location is outside of the expected range the template area 410 may be identified as a false-positive. In some embodiments, the method 100 is performed repeatedly on multiple images corresponding to a plurality of frames of image data. The frames need not be sequential frames. The determined location of the tow hitch may be compared over the plurality of frames and a deviation determined between the plurality of frames. If the deviation exceeds a predetermined limit, a confidence of the template area 410 containing the tow hitch 280 may be reduced indicative of the fact that the location of the tow hitch exhibits excessive movement in location between images.

In step 170 an indication is output indicative of the location of the tow hitch 280. The indication is output to a user of the vehicle. As noted above, the tow assist controller 200 is communicatively coupled to a display means 290. The display means 290 may be a display device or display screen mounted within the vehicle 250. For example, the display device may be arranged within a dashboard or display cluster of the vehicle to provide visual information to a driver of the vehicle 250. However in other embodiments the display means 290 may be a mobile device communicatively coupled to the tow controller 200, such as via a wireless or wired link, to output information therefrom. For example, the display means may be a mobile telephone, tablet computer etc., associated with the vehicle 250. The tow controller 200 is arranged in some embodiments of step 170 to output at least a portion of the image 105 and an indication based on the determined location of the tow hitch. The indication may be a visual indication displayed in relation to the image 105. The visual indication is provided to draw a viewer's attention to the location of the tow hitch 280 in the image 105, thereby enabling easier maneuvering of the vehicle 250 in relation to the tow hitch such as to couple to a trailer, even in difficult visibility conditions, such as low ambient light levels, darkness, shadow or where a background to the image makes observing the tow hitch difficult. In some embodiments, as noted above, the illumination means may be used to assist in such circumstances. However in other embodiments, the tow assist controller 200 may provide the indication of the location of the tow hitch 280 to an autonomous driving module (not shown). The autonomous driving module may utilise the indication of the location of the tow hitch to position or manoeuvre the vehicle to hitch the vehicle 250 to a trailer.

Whilst the above-described method comprises a combination of a plurality of techniques, it will be appreciated that embodiments may be envisaged which search within the selected region for image data corresponding to the tow hitch using only some of the described techniques. For example, embodiments may be envisaged where the Hough transform alone is used to detect a circular shape corresponding to the tow hitch 280. The location of the tow hitch is determined as a centre of the circular shape in the image data.

In another embodiment, the Hough transform may be used to identify circular regions for which a HOG is determined. The one or more HOGs are then provided to a classifier, such as the SVM classifier, described above.

Figure 5:
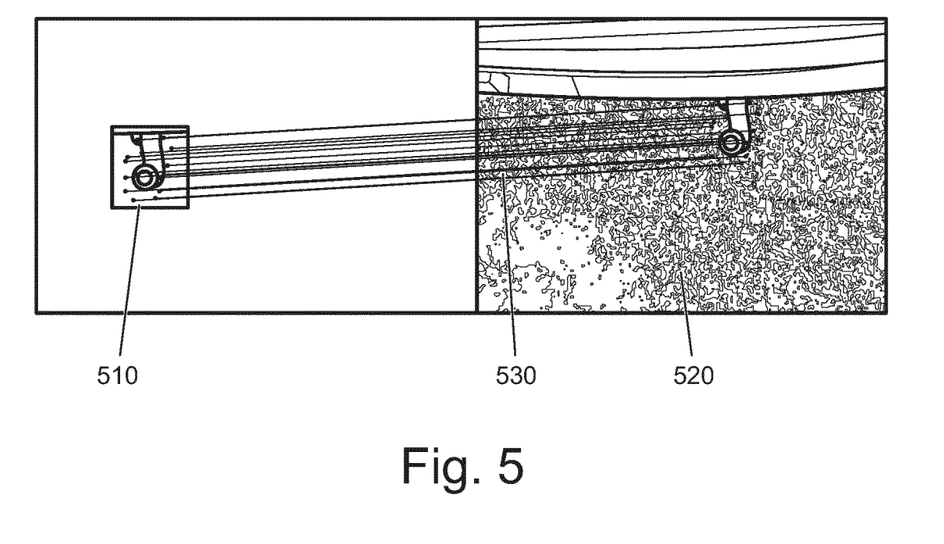
FIG. 5 shows a template and a region of an image according to an embodiment of the invention.

In another embodiment, searching within the selected region of the image 105 comprises searching the selected region for a template corresponding to at least a part of the tow hitch. In some embodiments the searching comprises applying a feature detector to the selected region. The searching may use a Speeded Up Robust Features (SURF) feature detector, or a feature detector based thereon, in some embodiments. Referring to FIG. 5, the right hand side of which, shows a region 520 of an image 105 comprising a tow hitch 250. The left-hand side of the FIG. 5 illustrates a template 510 for a tow hitch used on the vehicle 250. The template provides a reference for an expected shape of the tow hitch 280 in the image. It will be appreciated that more than one template 510 may be used where a plurality of different tow hitch designs are used on vehicles, or the template may differ from that illustrated. The SURF feature detector attempts to find a match to the template 510 in the region 520 of the image 105. In particular, the SURF feature detector attempts to find matching descriptors between the template 510 and the region 520 of the image 105, as will be appreciated. FIG. 5 illustrates with lines 530 a match between descriptors of the template 510 and the region 520. In this way, the location of image data corresponding to the template 510 is found within the region 520 by the feature detector.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system for determining a location of a tow hitch mounted to a vehicle, the system comprising:
    imaging means disposed in relation to the vehicle to output image data corresponding to an image; and
    processing means arranged to:
        receive the image data,
        select a region of the image, wherein the region is a portion of the image,
        detect a predetermined shape in the region of the image;
        extract a plurality of template areas of image data based on the detected predetermined shape;
        extract at least one feature from each of the plurality of template areas;
        perform a classification to identify which of the plurality of template areas contains the location of the tow hitch; and
        determine an indication of the location of the tow hitch based on the classification.

2. The system of claim 1, wherein the region of the image is a predetermined region within the image.

3. The system of claim 1, wherein the predetermined shape is a circle.

4. The system of claim 1, wherein the processing means is arranged to extract at least one feature from each of the plurality of template areas by determining a distribution of gradients associated with each potential location of the tow hitch within the selected region of the image.

5. The system of claim 1, wherein the processing means is arranged to detect the predetermined shape by applying a Hough transform to the selected region of the image to identify one or more locations of the predetermined shape, each location corresponding to a respective potential location of the tow hitch.

6. The system of claim 5, wherein the processing means is further arranged to output a Histogram of Gradients, HOG, associated with each potential location of the tow hitch within the selected region of the image.

7. The system of claim 1, wherein the processing means is arranged to use a Support Vector Machine classifier to perform the classification.

8. The system of claim 1, wherein the processing means is further arranged to use a Speeded Up Robust Features (SURF) feature detector.

9. The system of claim 1, wherein the processing means is further arranged to fit a shape corresponding to the tow hitch to the tow hitch region of the image data to determine the location of the tow hitch within the image.

10. The system of claim 1, comprising output means arranged to provide the indication of the location of the tow hitch to an occupant of the vehicle.

11. The system of claim 10, wherein the output means comprises a visual display means and the indication indicative of the location of the tow hitch comprises a representation of at least a portion of the image and a visual indicator indicative of the location of the tow hitch.

12. The system of claim 1, wherein the processing means is further arranged to output the indication of the location of the tow hitch to an autonomous driving module.

13. The system of claim 1, wherein the processing means is arranged to select the region of the image based on either or both an expected, approximate, location of the tow hitch and a resolution of the camera.

14. The system of claim 1, wherein the region is a rectangular region between first and second opposite corner locations in the image.

15. The system of claim 1, wherein the processing means is further arranged to determine the location of each corner location as a coordinate (x, y) with respect to a datum such as a corner of the image.

16. The system of claim 1, wherein the processing means is arranged to select the region of the image to be large enough to allow movement of the imaging means either or both during manufacture or use of the vehicle.

17. A controller for a vehicle tow assist system, the controller comprising:
    input means for receiving image data corresponding to an image of a region proximal to a vehicle; and
    processing means for:
        selecting a region of the image, wherein the region is a portion of the image;
        detecting a predetermined shape in the region of the image;
        extracting a plurality of template areas of image data based on the detected predetermined shape;
        extracting at least one feature from each of the plurality of template areas;
        performing a classification to identify which of the plurality of template areas contains the location of the tow hitch; and
        determining an indication of the location of the tow hitch based on the classification.

18. The controller of claim 17, further comprising output means for outputting the indication of the location of the tow hitch.

19. A method of determining a location of a tow hitch mounted to a vehicle, the method comprising:
    receiving image data corresponding to an image of a region proximal to a vehicle;
    selecting a region within the image, wherein the region is a portion of the image;
    detecting a predetermined shape in the region within the image;
    extracting a plurality of template areas of image data based on the detected predetermined shape;
    extracting at least one feature from each of the plurality of template areas;
    performing a classification to identify which of the plurality of template areas contains the location of the tow hitch; and
    determining an indication of the location of the tow hitch based on the classification.

20. The method of claim 19, wherein the predetermined shape is a circle.

* * * * *